Dec. 6, 1927.

K. F. W. KEMPF

METHOD OF MANUFACTURING BOLTS

Filed April 18, 1927  3 Sheets-Sheet 1

1,651,395

Karl F. W. Kempf, Inventor.
By Emil Kenhart
Attorney.

Witness:
J. J. Oberst,

Dec. 6, 1927.

K. F. W. KEMPF

METHOD OF MANUFACTURING BOLTS

Filed April 18, 1927   3 Sheets-Sheet 2

Karl F. W. Kempf, Inventor.
By Emil Neubart
Attorney.

Witness:
J. J Oberst,

Dec. 6, 1927.
K. F. W. KEMPF
1,651,395
METHOD OF MANUFACTURING BOLTS
Filed April 18, 1927     3 Sheets-Sheet 3
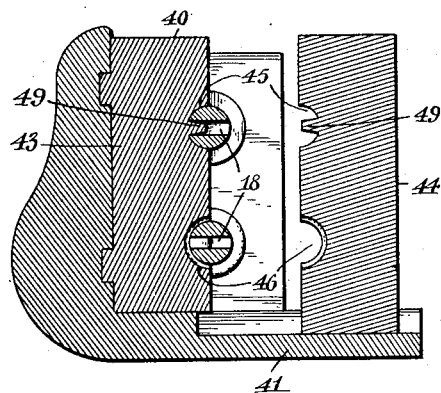
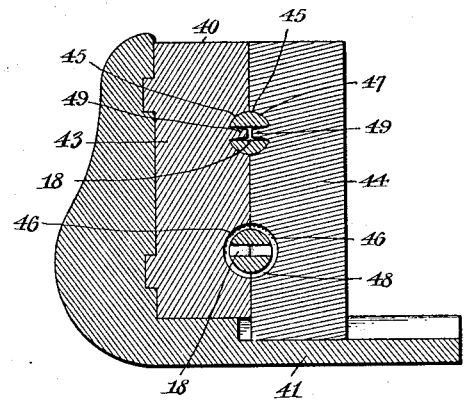
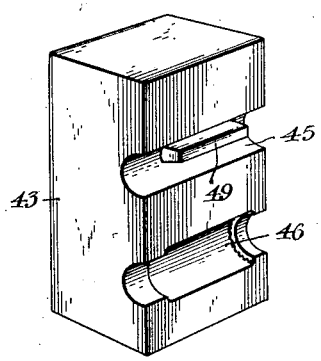
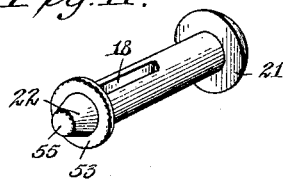
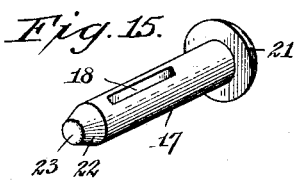
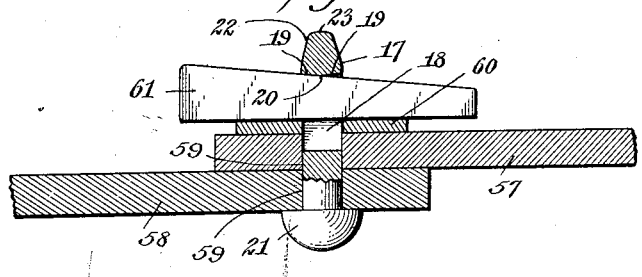
Karl F. W. Kempf, Inventor.
By Emil Hubach
Attorney.
Witness:
T. J. Oberst.

Patented Dec. 6, 1927.

1,651,395

UNITED STATES PATENT OFFICE.

KARL F. W. KEMPF, OF BUFFALO, NEW YORK.

METHOD OF MANUFACTURING BOLTS.

Application filed April 18, 1927. Serial No. 184,525.

My invention relates to improvements in methods of manufacturing bolts, and especially key bolts.

One of the objects of my invention is the production of key bolts under my new and novel method wherein a slot is formed longitudinally through the bolt, the end of the bolt tapered and simultaneously therewith the outer wall of the slot provided with a reverse bevel so that the key can be inserted into the slot from either side thereof.

Another object of my invention is the production of a new and novel method whereby the outer end of the bolt is tapered and the metal at said end materially condensed during the process of tapering the same.

A still further object of my invention is the production of a new and novel method whereby key bolts can be easily and inexpensively manufactured with a view of reducing the cost of the same, providing a more serviceable key bolt, and one capable of use without resorting to the employment of centering tools for introducing the bolts into bolt holes of overlapping objects.

The invention consists in the new and novel steps, arrangement, and combination of steps employed in the method of producing key bolts, as will be hereinafter set out and more particularly pointed out in the subjoined claims.

In the drawings:—

Fig. 11 is a section taken on line 11—11, Fig. 7.

Fig. 12 is a section taken on line 12—12, Fig. 8.

Fig. 13 is a detached perspective view of one of the sections of the bolt retainer block.

Fig. 14 is a perspective view of a rudimentarily formed key bolt.

Fig. 15 is a perspective view of a completely formed key bolt.

Fig. 16 is a sectional elevation of a key bolt constructed in accordance with my improved method, and showing it employed to connect two plates or structural elements together.

Figure 1:
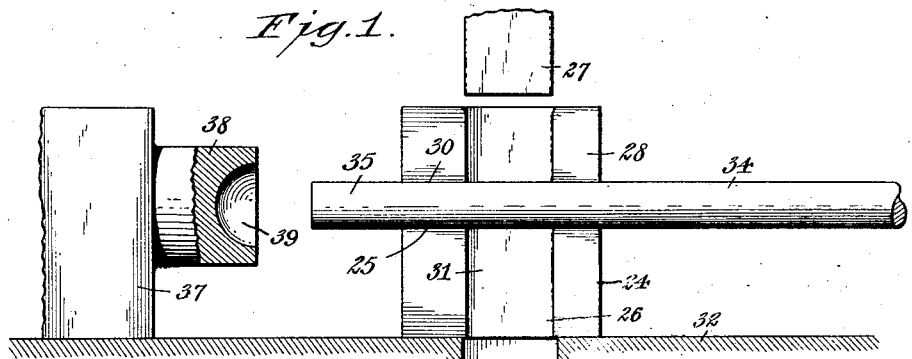
Fig. 1 is a sectional elevation of slotting and heading mechanism employed in my improved method illustrated in my co-pending application, filed May 10, 1926, Serial No. 108,047, the co-operating parts of the mechanism being shown in in-operative position.
Figure 2:
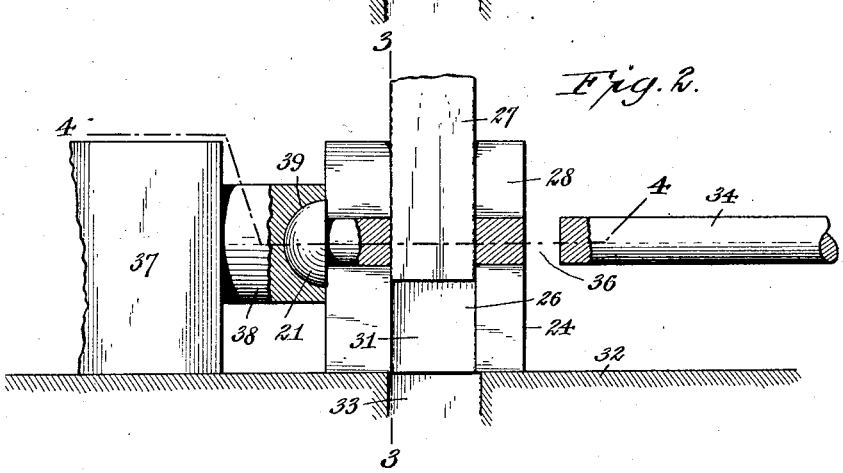
Fig. 2 is a similar view showing the parts in operating position.
Figures 3, 4:
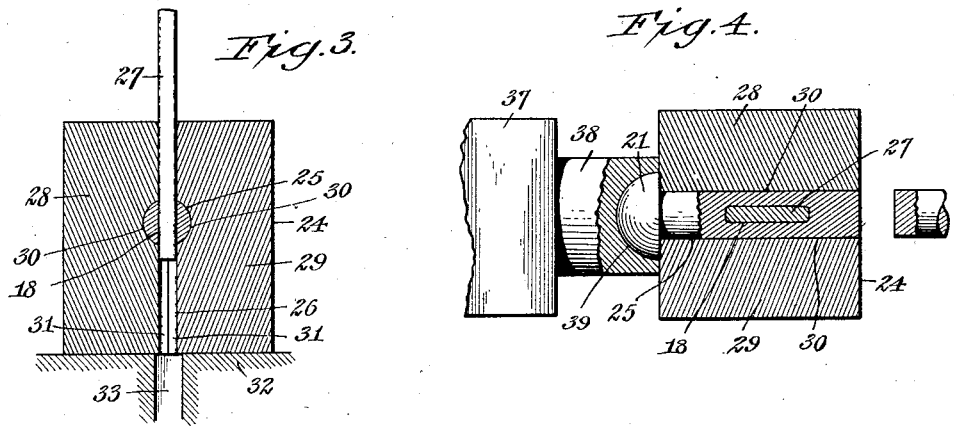
Fig. 3 is a vertical section taken on line 3—3, Fig. 2.
Fig. 4 is a horizontal section taken on line 4—4, Fig. 2.

Having reference first to a key bolt constructed under my improved method, it may be stated that key bolts are slotted diametrically for the purpose of forcing wedge keys into the slots thereof so as to draw the bolt tight under all conditions of use. Such bolts sometimes referred to as "fitting-up bolts" are usually employed for temporary or setting-up work, such as the fitting together of plates adapted to be permanently secured together by means of rivets or other suitable permanent fastening devices. When used, a key bolt extends through the parts or objects which it temporarily secures together and the unheaded end thereof projects a considerable distance outwardly from one of the parts so that a wedge key adapted to be used in conjunction therewith can be passed through the slot in the bolt, and when driven tightly into position causes the parts or objects through which the bolt is passed to be drawn together tightly, and in the exact relation they are to assume and retain when permanently fastened together. This key bolt, when completed, does not materially differ in appearance from the key bolt illustrated in my aforesaid co-pending application, and in the drawings it is designated by the numeral 17. The key bolt is provided with a key slot 18 which extends diametrically through the shank of the bolt and has its outer end wall beveled outwardly in opposite directions, as at 19, from a plane centrally between the ends thereof, indicated by the numeral 20, which forms the crest of this end wall. The key slot is therefore somewhat shorter at the center of the bolt than at opposite sides of the same. The key bolt is provided with the usual head 21 at one end which provides a bearing against the face of one of the parts or objects through which the bolt is passed.

The unheaded or entrance end of the bolt is tapered, as at 22, and its end face is made convex, as at 23. The taper of the bolt extends preferably from a point near the outer end of the slot 18 and is formed in accordance with my improved method, to be presently described, and simultaneously therewith the oppositely beveled portions 19, hereinbefore referred to are formed.

In Figs. 1 to 4 of the drawings, heading and slotting mechanism is shown in connection with a rod adapted to be cut by suitable means (not shown) into bolt lengths and be diametrically slotted and headed to partially form the bolt. The heading and slotting mechanism comprises a rod-receiving block or body 24 having a cylindrical rod-receiving opening 25 and a slot 26 perpendicular thereto into which a slotting tool 27 is adapted to be thrust for the purpose of diametrically slotting the rod when confined within the block.

Said rod-receiving block or body 24 is preferably formed of two sections 28, 29, which are exact counterparts and adapted to lie in contact with each other, each section having a semi-cylindrical groove 30 formed in its contacting face which form the rod-receiving opening 25. Intersecting each of these semi-cylindrical grooves is a depression 31, one in each contacting surface of sections 28, 29 of the block. These depressions form the tool slot 26 arranged perpendicular to the cylindrical opening 25. Said rod-receiving block or body 24 has its sections relatively movable, preferably one movable toward and from the other, and these sections are arranged upon a table or other suitable support 32 which may also have an opening 33 therethrough, preferably somewhat larger in transverse and longitudinal dimensions than the dimensions of the tool slot 26 with which it is alined. A rod from which the bolts are to be constructed is designated by the numeral 34 and it is clamped in and extends through the cylindrical rod-receiving opening 25 in the block 24 so that the end portion thereof projects from one end of the block, as at 35. This projecting end portion contains sufficient metal to enable the head 21 of the bolt to be formed therefrom. The rod 34 is held against lengthwise movement within the block 24 in any suitable manner, but preferably the semi-cylindrical grooves 30 in the two sections 28, 29 of the block are sized to have a clamping effect upon the rod and thus prevent movement lengthwise thereof.

With the rod positioned against lengthwise movement within the rod-receiving block 24, the slotting tool 27 is driven downwardly by any suitable means and under any suitable power into the tool slot 26 of the block, and diametrically through that portion of the rod clamped within the block for the purpose of forming the slot 18 in the bolt.

The rod 34 is preferably severed during the slotting operation, as at 36, so that the bolt to be formed will be of the desired length and this length may be governed by the entrance end of the block or in any other approved manner. The severing of the rod may, however, take place before or after the slotting operation, if desired. The material forced from the rod to form the slot 18 of the bolt passes downwardly through the lower end of the tool slot 26 and out through the opening 33 formed in the table or other foundation or support provided for the block, and may there be accumulated as scrap.

During the slotting operation or, if desired before or after said operation, the projecting portion 35 of the rod or of the severed portion of the rod, as the case may be, is upset to form the head 21 of the bolt, and for this purpose an upsetting device 37 is provided, which is movable lengthwise toward and from the rod-receiving block 24. This upsetting device, or heading device, as it may be termed, is provided with a socketed member 38, the socket 39 of which is shaped to the form which the head of the bolt is to be fashioned to; such heads being usually of semi-spherical formation. Under pressure or force applied in any approved manner to the upsetting or heading device 37, it engages the projecting end 35 of the rod or the severed portion thereof, reduces the length of said projecting portion and forces the metal thereof laterally or radially in all directions so as to completely fill the socket 39 in said device.

It may here be stated that the various steps in the upsetting or heading of the bolt is preferably effected during or after the slotting operation and preferably while the slotting tool still extends through the rod clamped between the two sections of the block 24. It will therefore be apparent that the rod-receiving block or body used for the slotting operation also serves as part of the upsetting or heading mechanism, since during the upsetting or heading operation the slotting tool extends through the rod and prevents lengthwise movement of said rod, or the severed portion thereof, as clearly shown in Fig. 2.

It may here be stated that the various steps in the method are performed while the rod and the partially and rudimentarily formed bolts are hot; the proper heating being effected in any common or approved manner.

After the rod is severed to provide the proper length of material for forming the bolt, the diametral slot formed therein and the head formed upon one end thereof, the so partially constructed bolt is acted upon by a second set of co-operating members serving as tapering mechanism and incidentally for forming the opposite bevels 19 on the outer end wall of the key slot. This set of co-operating members comprises a bolt-retainer block or body 40 supported upon a table 41 which, if desired, may be the same table supporting the bolt retainer block 24, and co-operating with the bolt retainer block or body 40 is a pressure or power device 42 suitably operated and arranged in spaced relation to one end of said bolt retainer block 40 for movement toward and from the same.

The bolt-retainer block or body 40 is also made of two sections 43, 44, one of which is preferably movable toward and from the other. On the opposing faces of these two sections, semi-cylindrical grooves 45, 46 are formed, one above the other, the grooves 45 being adapted for registration to form a cylindrical bolt-retainer opening 47 and the grooves 46 being likewise disposed relatively to form a cylindrical bolt-retainer opening 48.

The semi-cylindrical grooves 46 are enlarged between their ends so that when the two sections of the block 40 are brought together, the bolt-retaining opening formed by these last-mentioned grooves has end portions sized to slidably receive the partially-formed bolt, as will be more particularly described hereinafter, and an intermediate portion of somewhat greater diameter than the diameter of the partially formed bolt.

Disposed lengthwise in each of the semi-cylindrical grooves 45 and terminating short of the ends thereof is a bolt retainer rib or key 49. These ribs or keys are arranged to oppose each other, and when the two sections of the block are brought into contact with each other the longitudinal edges of these keys are slightly separated, as clearly shown in Fig. 12. These ribs or keys project from the walls of the semi-cylindrical grooves 45 and are slightly tapered toward their longitudinal edges. The ends of the keys are also tapered for a purpose to appear hereinafter. When the two sections of the block 40 are brought into contact to establish the bolt retainer opening 47, said opening may be said to have bolt-retainer keys projecting inwardly from their walls at diametrically opposite sides.

The pressure or power device 42 is provided with a reducer 50 in the form of a cylindrical extension arranged to project toward the bolt-retainer block 40, and in the outer end thereof it is provided with an inwardly-tapered socket 51 having its side walls formed to the shape which the tapered end of the bolt is to have when completed. An air passage 52 leads from the inner end of this socket outwardly to the side of the cylindrical extension 50.

Figure 5:
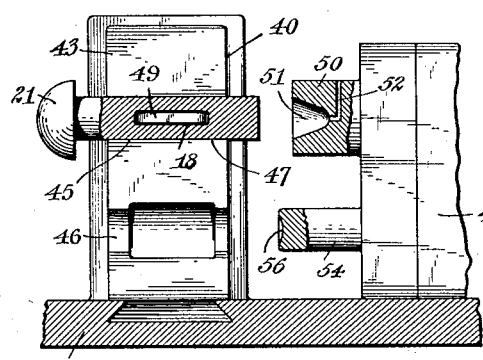
Figs. 5, 6, 7 and 8 are sectional elevations of my improved bolt-forming mechanism, illustrating the several steps employed under my improved method for tapering the end of the bolt and providing the outer end wall of the key slot thereof with a reverse bevel.
Figure 6:
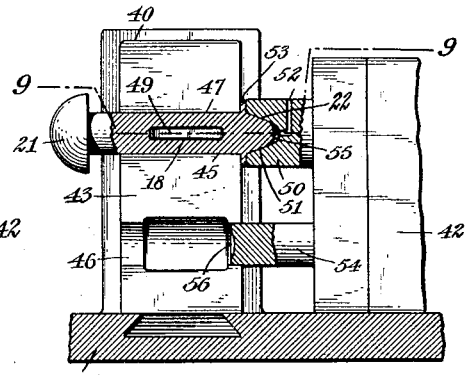

As clearly shown in Figs. 5 and 6, the bolts partially formed by the use of the bolt-retainer block 24 are inserted into the bolt-retainer block 40 for the purpose of having the ends thereof tapered according to my improved method. In order to insert the partially formed bolts in the retainer block or body 40, the two sections of the latter are separated. The bolt partially formed is placed within the upper semi-cylindrical groove 45 of one of the sections of said block with the retainer key in said groove entered into the key slot 18 of the partially formed bolt, after which the other section is moved into contact with the section having the bolt applied thereto so as to completely encircle the bolt and cause the bolt retainer key of said other section to enter said key slot from the opposite side of the bolt. With the two sections of the bolt-retainer block or body in contact, the partially formed bolt will be firmly gripped within said block or body and held against lengthwise movement by the bolt retainer keys entered into the key slot of said partially formed bolt from opposite sides. By reason of the ends and the sides of the retainer keys being tapered inwardly they will freely enter the key slot of the partially formed bolt and in addition to providing free entrance of the retainer keys into said slots, the tapering of the outer ends of said retainer keys also provides clearance for extrusion of the metal inwardly at the outer end of the key slot.

After a partially formed bolt is inserted into the upper bolt retainer opening 47 of the block 40, the pressure or power device 42 is advanced toward said block, with the result that the reducer 50 is forced over the projecting unheaded end of said partially formed bolt, causing the metal at said projecting end in part to be condensed inwardly toward the axis of the partially formed bolt and also extruded outwardly in all directions and lengthwise along the bolt to form an annular flange 53 on said bolt, which is firmly compressed by the end face of the reducer against the block 40. Simultaneously with the condensing of the metal toward the axis of the body, there is a component movement of the metal lengthwise along the axis of the bolt, with the result that this metal will be extruded into the key slot and against the outer tapered ends of the retainer keys 49 projecting into said key slot, thus forming the opposite bevel at the outer end of the key slot simultaneously with the tapering of the projecting end of the bolt. While the tapering of the outer ends of the retainer keys 49 limits the extrusion of the metal into the key slot under the force of the pressure or power device 42; it has, however, been found that force applied to the projecting end of the bolt will naturally form an opposite bevel on the outer end wall of the key slot, regardless of the employment of the retainer keys, and for this reason the partially formed bolt may be positioned within the block 40 and the retainer keys eliminated, provided provision is made otherwise to prevent lengthwise movement of the partially formed bolt when clamped within the block 40.

The so rudimentarily formed key bolt is next placed within the lower bolt-retainer opening 48 of the block 40 and at the same time a bolt partially formed by the retainer block 24 is inserted into the upper bolt-retainer opening of said block so that upon further operations of the pressure or power device, two bolts will be operated upon under each forward or advancing movement of said power device. The partially formed bolt in the upper bolt-retainer opening in said block will be operated upon as just described, while the rudimentarily formed bolt having the annular flange 53 thereon will be operated upon by a cylindrical ram 54 formed on the pressure or power device 42. When the rudimentarily formed bolt is positioned within the lower bolt-retainer opening within the block 40, the slotted intermediate portion thereof will be confined within the enlarged portion of said opening, while the annular flange of the rudimentarily formed bolt will lie in contact with that face of the block 40 opposed to the pressure or power device.

Figure 8:
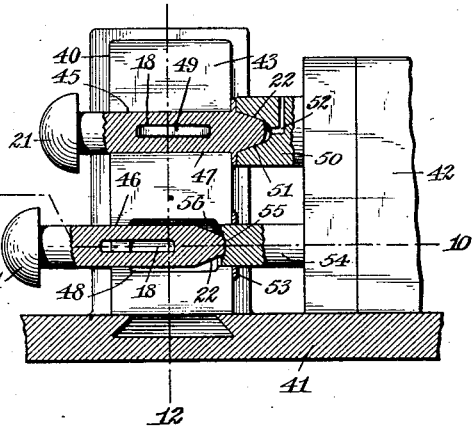

It is to be noted that when the partially formed bolt is being tapered, the outer end face of the bolt is given a convex formation, as at 55, Fig. 6, which is the convexed end face 23 of the finished bolt shown in Figs. 15 and 16, and the ram 54 has its end face concaved, as at 56, to conform to the convexity at the end of the rudimentarily formed bolt. Therefore, when the pressure or power device is advanced toward the block 40, the concaved end of the ram 54 will engage the projecting end of the bolt, and as pressure is applied endwise to the bolt, the annular flange 53 will be sheared from the body of the bolt, as clearly indicated in Fig. 8, thus completing the key bolt. This ram enters the end of the lower bolt retainer opening in the block 40 and forces the bolt outwardly from the block.

In order to shear the flange from the block, considerable pressure is necessarily exerted against the unheaded end of the bolt, and this at times tends to enlarge the diameter of the bolt slightly in the region extending along the range of the key slot therein. By providing the enlargement between the ends of the bolt-retainer opening 48 a comparatively short contact surface for the bolt is formed at each end of said opening. Jamming or binding of the bolt within the opening is partially eliminated, particularly since the contact surface between the bolt retainer opening and the key bolt are along solid portions of the key bolt. In the event that the bolt becomes slightly enlarged diametrically along the region of the key slot 18, it will be returned to normal size when forced outwardly by the ram 54.

One of the uses of the key bolt is illustrated in Fig. 16 in which two plates 57, 58 are overlapped and the bolt passed through the registering rivet or other fastener openings 59 within said plates. Over the projecting end of the bolt a washer 60 may be placed and a wedge key 61 inserted into the key slot 18 of the bolt from either side thereof so that the beveled edge of the key slot will bear in contact with one of the opposite or reverse bevels 19 formed on the outer end wall of said key slot. The slotted region of the bolt, of course, projects at least partially beyond the washer 60. The tapered end of the bolt permits the same to be easily inserted through the registering openings of the plates or other objects to be fastened together, and as these openings are sometimes slightly out of registration, they will be brought into registration by the tapered end of the bolt when driving said bolt through the openings in the plates or other objects to be fastened together.

Figure 7:
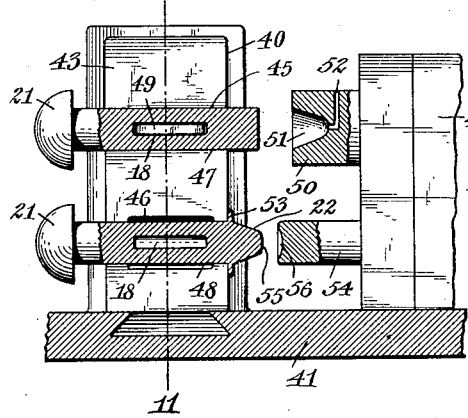
Figure 9:
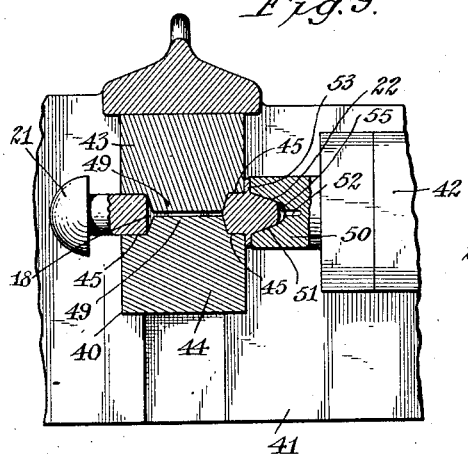
Fig. 9 is a section taken on line 9—9, Fig. 6.
Figure 10:
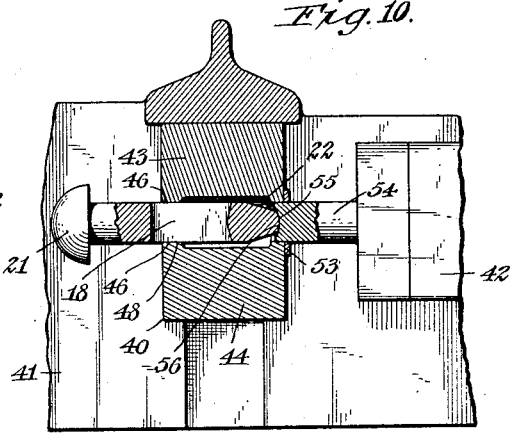
Fig. 10 is a section taken on line 10—10, Fig. 8.

The steps in my improved method are therefore as follows: The rod from which the bolts are formed are diametrically slotted and headed, as for example illustrated in Figs. 1 and 4, after which the ends of the so partially formed bolts are tapered and the annular flange simultaneously formed on the bolt at the inner end or base of the tapered portion thereof. The forming of this flange and the tapering of the end of the bolt result in a condensing of the metal, which is highly desirable, at the end of the bolt, especially when driving the bolt through holes slightly out of registration. At the same time the metal is forced inwardly toward and along the axis of the bolt, with the result that it is slightly extruded into the key slot of the bolt previously formed so as to form the opposite or reverse bevels at the outer end of the key slot, all of which is clearly illustrated in Figs. 5, 6 and 9. After the bolt is so rudimentarily formed the annular flange is sheared therefrom to complete the bolt for use, as clearly shown in Figs. 7, 8 and 10.

While I have referred to a rod, a "partially formed bolt", and a "rudimentarily formed bolt", I desire to include these and any other objects treated in the manner described under the term "work-piece"; and I desire it to be understood that what I term a partially formed bolt is, by some, considered and used as a finished key bolt and a marketable product. Therefore a bolt as considered or a modified form thereof may be tapered in the manner herein described.

Having thus described my invention, what I claim is:

1. The method of manufacturing bolts, which consists in forming the head of the bolt on a rod of suitable length, in confining a portion of the rod so formed within a surrounding body and holding said rod against movement lengthwise with the unheaded end thereof projecting from said body, in then applying pressure to the projecting unheaded end of said rod and simultaneously therewith forcing metal at said end inwardly toward the axis of the rod and lengthwise exteriorly against said body into a region surrounding said rod so as to taper said end and form an annular flange thereon, and in then removing said flange from said rod.

2. The method of manufacturing bolts, which consists in forming the head of the bolt on a rod of suitable length, in confining a portion of the rod so formed within a surrounding body and holding said rod against movement lengthwise with the unheaded end thereof projecting from said body, in then applying a reducer to the projecting end of said rod to condense the metal at said end and simultaneously therewith force metal lengthwise exteriorly along the rod into a circular region surrounding the same so as to form an annular flange thereon, and in then removing said flange.

3. The method of manufacturing bolts, which consists in forming the head of the bolt on a rod of suitable length, in confining a portion of the rod so formed within a surrounding body and holding said rod against movement lengthwise with the unheaded end thereof projecting from said body, in then applying a reducer having an inwardly-tapering socket to the projecting end of said rod to cause the walls of said socket to act against said rod and condense the metal by directing the same inwardly toward the axis of said rod and lengthwise along the same and the end of said reducer to force metal outwardly along said rod into the shape of an annular flange.

4. The method of manufacturing key bolts, which consists in confining within a body so as to prevent lengthwise movement thereof, the shank of a partially formed bolt having a head at one end and a diametral slot through its shank and in so positioning said bolt with the unheaded end thereof projecting from said body, and in applying pressure to the projecting end of said bolt so as to condense the metal at said end and taper the same and also direct portions of the metal lengthwise along the axis of said shank to form a reverse bevel on the end wall of said diametral slot adjacent the projecting end of said shank.

5. The method of manufacturing key bolts, which consists in diametrically slotting a rod of suitable length and heading one end thereof, in confining the slotted portion of said rod within a body so as to prevent movement lengthwise thereof and having the unheaded end of said rod projecting from said body, in applying pressure to the projecting end of said rod lengthwise and toward the axis of said rod so as to taper and condense the metal at said end, force metal lengthwise exteriorly along said rod to form an annular flange at the base of the taper and interiorly along the axis of said rod to extrude the metal at the outer end wall of said diametral slot so as to form opposite bevels on said end wall.

6. The method of manufacturing key bolts, which consists in severing a rod to bolt length, heading one end of the severed portion and diametrically slotting the same, in forcibly applying an element having a tapered socket over the unheaded end of said bolt to condense the metal and form a tapered end for said bolt and in simultaneously forcing metal therewith lengthwise exteriorly along said end to form an annular flange at the base of said tapered end, and in then shearing said flange from said bolt.

7. The method of forming a tapered end on a bolt, which consists in confining the shank of the bolt within a body to prevent lengthwise movement thereof, in then condensing the metal at the unheaded end of said bolt and forcing portions of the metal at said end lengthwise exteriorly along the bolt to form an annular flange at the base of the condensed metal, and in then applying pressure to the tapered end of the bolt while holding said flange in an immovable position so as to cause the body portion of said bolt to be sheared from said flange.

8. The method of manufacturing key bolts, which consists in severing a rod to bolt length and heading and diametrically slotting the same, in then tapering the unheaded end of said bolt under pressure and simultaneously therewith crowding the metal axially along said bolt to form opposite bevels at the end of said diametral slot adjacent said tapered end.

9. The method of tapering the ends of key bolts having a head and a diametral slot through the shank thereof, which consists in applying a pressure device having a tapering socket over the unheaded end of said shank while holding the shank against movement lengthwise so as to cause metal at said end to be forced lengthwise exteriorly along the same and form an annular flange thereon and simultaneously therewith condense the metal at said end to taper the same, and in then causing, under pressure, a relative movement of said shank and flange to shear said flange from said shank.

10. The method of tapering the ends of key bolts having a head and a diametral slot through the shank thereof, which consists in applying a pressure device having a tapering socket to the end of said shank while holding the latter against movement lengthwise so as to cause metal at said end to be forced lengthwise exteriorly along the same and form an annular flange thereon and simultaneously therewith condense metal at said end to taper the same, and in then removing said flange from said shank.

In testimony whereof I affix my signature.

KARL F. W. KEMPF.